Patented Jan. 10, 1950

2,494,295

UNITED STATES PATENT OFFICE 2,494,295

COMPOSITIONS OF RESINOUS EPOXIDES AND AROMATIC SULFONAMIDE-ALDEHYDE CONDENSATES

Sylvan Owen Greenlee, Racine, Wis., assignor to Devoe & Raynolds Company, Inc., Louisville, Ky., a corporation of New York No Drawing. Application September 13, 1946, Serial No. 696,937

6 Claims. (Cl. 260—45.2)

This invention relates to new products and compositions resulting from the reaction of condensates of aldehydes and sulfonamides with polyepoxides or complex epoxides in regulated proportions to give valuable compositions which are useful in the manufacture of varnishes, molding compositions, adhesives, films, molded articles, etc.

The invention includes initial reaction mixtures or compositions containing the polyepoxides or complex epoxides with the sulfonamide aldehyde condensates, as well as intermediate and final reaction products or compositions and methods for their production and articles and products made therefrom.

The invention includes as primary and important embodiments thereof reaction mixtures and reaction products of the polyepoxides and of the complex epoxides with the condensates of sulfonamides and aldehydes.

According to the present invention, condensates of sulfonamides and aldehydes, in the form of initial or intermediate reaction or condensation products, are admixed with polyepoxides or with complex epoxides, or are reacted with such epoxides to form new compositions suitable for reaction or further reaction to form new complex reaction products.

One of the objects of the invention is the production of initial reaction mixtures or compositions containing the condensates of sulfonamides and aldehydes with complex epoxides in proportions suitable for reaction to form resins, films, molding compositions, etc.

Another object of the invention is the production of intermediate reaction products of such sulfonamide aldehyde condensates with polyepoxides or complex epoxides which are capable of further reaction to form insoluble infusible products and the preparation of higher melocular weight and more complex compositions from such intermediate reaction products.

Another object of the invention is the production of films, articles, molded products and other final reaction products from such condensates and simple polyepoxides or from such condensates and complex epoxides.

Other objects of the invention will appear from the following more detailed description.

The condensates of sulfonamides and aldehydes which are used for reacting with the polyepoxides or with the complex epoxides according to the present invention are initial or intermediate reaction or condensation products formed by the reaction of sulfonamides, such as toluene sulfonamide, with aldehydes, such as formaldehyde. It is known that various sulfonamides will condense with aldehydes to form aldehyde sulfonamide condensates or resins. Thus, it is known that toluenesulfonamides, for example, will react with formaldehyde to form resinous condensation products; and that other sulfonamides, such as naphthalenesulfonamides, substituted benzenesulfonamides, sulfonamides of aromatic ethers (e. g. etherified phenols), etc. will react with aldehydes to form condensates or resins; and that other aldehydes, e. g. furfural, benzaldehyde, etc., can be used with sulfonamides to form such condensates or resins.

The condensates of sulfonamides and aldehydes which are used with polyepoxides or complex epoxides in making the new compositions of the present invention are in general partial and intermediate reaction or condensation products, and particularly soluble condensation products which are soluble in the same solvents as the polyepoxides or the complex epoxides, or fusible condensation products which can be melted and blended with the polyepoxides or complex epoxides.

The polyepoxides used for reaction with the condensates of sulfonamides and aldehydes contain two or more epoxide groups. The polyepoxides are of a complex character such as those that result from the reaction of two or more mols of a diepoxide with one mol of a dihydric phenol, or the reaction of three or more mols of a diepoxide with one mol of a trihydric phenol, etc. The polyepoxide compounds used may have varying structures and may be of complex structure so long as they do not contain groups which interfere with the desired reaction of the polyepoxide and the aldehyde sulfonamide condensate.

The complex epoxides used in making the new compositions are produced by the reaction of polyhydric phenols with polyfunctional halohydrins and alkali or with polyepoxides to form complex reaction products containing terminal epoxide groups. The production of such complex epoxides is described in my companion applications, Serial Nos. 617,176, filed Sept. 18, 1945; 621,856, filed Oct. 11, 1945, and 626,449, filed Nov. 2, 1945.

In my companion application, Serial No. 626,449, I have described new polyepoxy products and compositions obtained by the direct addition of polyhydric phenols with polyepoxides and with the proportion of polyepoxides reacting with the polyhydric phenols in excess of the equivalent amount so that the resulting reaction products will contain terminal epoxy groups. Such polyepoxy reaction products are advantageously used for reaction with the sulfonamide aldehyde condensates to give the new compositions and products of the present invention.

In my companion application Serial No. 653,156, filed March 8, 1946, I have described complex epoxide containing compositions obtained by the reaction of phenol aldehyde condensates with polyepoxides to give compositions which contain unreacted epoxide groups. Such epoxide compositions are also advantageously used for reaction with the aldehyde sulfonamide condensates to give the new compositions and products of the present invention.

In my companion application Serial No. 617,176, I have described complex polymeric reaction products of polyhydric phenols with polyfunctional halohydrins such as epichlorohydrin and glycerol dichlorohydrin, with the difunctional chlorohydrin used in proportions in excess of that equivalent to the polyhydric phenol and less than twice the equivalent amount, by carrying out the reaction with the addition of caustic alkali equal to or somewhat in excess of the amount required to combine with the halogen of the halohydrin to give complex polymeric products containing terminal epoxy groups and terminal hydroxyl groups and with the epoxy groups in general considerably in excess of the terminal primary hydroxyl groups. Such complex polymeric epoxy-hydroxy products and compositions are advantageously used for reaction with the sulfonamide aldehyde condensates to give the new compositions and products of the present invention.

In my companion application Serial No. 621,856, I have described the epoxy-hydroxy compositions resulting from the reaction of a polyhydric phenol with a polyfunctional halohydrin such as epichlorhydrin in approximate proportions of 2 mols of epichlorohydrin to 1 mol of dihydric phenol to give resinous products containing both terminal epoxy and hydroxy groups with the proportion of terminal epoxy groups considerably in excess of the terminal hydroxy groups. Such epoxy-hydroxy compositions are also advantageously used for reaction with the aldehyde sulfonamide condensates to give the new compositions and products of the present invention.

Complex epoxide containing compositions can also be produced by the reaction of complex polyhydric phenols with polyfunctional halohydrins such as epichlorohydrin and glycerol dichlorohydrin, with the difunctional chlorohydrin used in proportions in excess of that equivalent to the polyhydric phenol; the polyhydric phenol being a complex polyhydric phenol derived from the reaction of a simple polyhydric phenol such as resorcinol, hydroquinone, and bisphenol (p,p'-dihydroxy-diphenyl dimethyl methane) with polyhalides which contribute no hydroxyl groups to the resulting composition, using the polyhydric phenol in proportions in excess of that equivalent to react with all of the halogen groups present in the polyhalide. Such complex epoxy-hydroxy products and compositions are also advantageously used for reaction with the aldehyde sulfonamide condensates to form the new compositions and products of the present invention.

The complex epoxides used with the aldehyde sulfonamide condensates or resins contain epoxide groups or epoxide and hydroxyl groups as their functional groups and are free from other functional groups such as basic and acid groups.

The aldehyde sulfonamide condensates or resins used for compounding and reacting with the polyepoxides and complex epoxides may be at different stages of conversion or condensation when used for compounding with the polyepoxides or complex epoxides and compositions of somewhat different character can be obtained with products of different stages of conversion. Thus in some cases it is desirable to have a composition which is completely soluble in a common solvent or mixture of solvents and in that case it is advantageous to use an aldehyde sulfonamide condensate which is soluble in solvents in which the polyepoxide or complex epoxide is also soluble. By using the aldehyde sulfonamide condensate and epoxide in a common solvent, solutions can be prepared and applied and the solvent subsequently evaporated before the main reaction between the epoxide and the condensate takes place. Compositions can thus be made which are solutions of the condensate and epoxides and which can be used to impregnate porous materials, etc., and the reactants subsequently caused to react after removal of the solvent and heating to a high temperature.

For other purposes it is desirable to use a powdered solid resin with a liquid reactant and in such cases the aldehyde sulfonamide condensate may be a finely divided solid material and the polyepoxide or complex epoxide used in a liquid form. For other applications very viscous compositions are desired and in this case one or more ingredients of the reaction mixture, or the reaction mixture itself, can be polymerized or reacted so as to obtain the desired viscosity.

In making the new compositions the aldehyde sulfonamide condensate and the epoxide are compounded in reacting proportions either without or with the addition of a catalyst and the reaction will in general be carried out with the application of heat.

The reactions which take place between the aldehyde sulfonamide condensate and the polyepoxide or complex epoxide appear to be complex in nature. While I do not desire to limit myself by any theoretical explanation of the exact nature or mechanism of the reaction it seems probable that the reaction is in part one between an epoxide group of the polyepoxide or of the complex epoxide and active hydrogen atoms directly attached to oxygen or to nitrogen in the aldehyde sulfonamide condensate. Since it is known that the aldehyde sulfonamide condensates convert upon the application of heat under proper conditions to infusible products, it seems likely that the final conversion of the compositions containing such condensates and also containing the polyepoxides or complex epoxides include a number of reactions, among them the normal condensation reactions of the aldehyde sulfonamide condensate and the reaction of epoxide groups of the epoxides by direct addition to hydroxyl groups or to amide groups of the condensates; while reaction may also take place between epoxide groups with hydroxyl groups present in the epoxides or liberated in the course of the reaction of epoxide groups with hydroxyl groups; and direct polymerization may take place of the epoxides with themselves. Whatever the theoretical explanation may be of the complex reactions which take place when the epoxides are compounded with the aldehyde sulfonamide condensates and caused to react therewith, valuable reaction products can be produced as a result of such reactions.

It may be that various reactions take place simultaneously or successively in the process of reaction between the epoxides and the aldehyde sulfonamide condensates to form the intermediate and final reaction products. It may be also that certain reactions take place at a more rapid rate than others at different stages of the reaction.

Just as different aldehyde sulfonamide condensates may be more or less reactive with the epoxides, so the different epoxides may vary in their activity with the aldehyde sulfonamide condensates.

Similarly the reactivity of the different complex epoxides with the aldehyde sulfonamide condensates is somewhat dependent upon the type or structure and equivalent weight of the complex epoxides. The equivalent weight as used in referring to the complex epoxides means the weight which is equivalent to one epoxide group or the weight which is capable of entering into reaction by direct addition with one hydroxyl group or one amino group. The method used for determining the epoxide content or equivalent weight of the composition per epoxide group was by heating one gram sample of the epoxide composition with an excess of pyridine containing pyridine hydrochloride (made by adding 16 cc. of concentrated hydrochloric acid per liter of pyridine) at the boiling point for 20 minutes and back titrating the excess pyridine hydrochloride with 0.1 N sodium hydroxide using phenolphthalein as indicator, and considering that 1 HCl is equivalent to one epoxide group.

Usually the complex epoxides of low equivalent weight to epoxide groups are more highly reactive with the aldehyde condensates than complex epoxides of higher equivalent weight to epoxide groups. In general, the complex epoxides advantageously contain more than one epoxide group per molecule and may advantageously contain an average of around one and one-half or up to two epoxide groups per molecule. The complex epoxides are in general resinous in character. They may in some cases be liquid products, but for many practical purposes the resinous polyepoxides used are solid at ordinary temperatures. The complex epoxy resins are soluble, unless too highly polymerized, in solvents such as acetone, methyl ethyl ketone, diacetone alcohol, cyclohexanone, etc.; and some of the complex epoxides of low melting point and low degree of polymerization are soluble in toluene.

Catalysts which have been found particularly advantageous for bringing about the reaction of the epoxides with the aldehyde sulfonamide condensates are alkaline catalysts, such as aliphatic amines, sodium and potassium hydroxide and alkali phenoxides. Certain of the Friedel-Crafts type catalysts are also catalytic for these reactions. Of such catalysts boron trifluoride has been found to be extremely active in promoting such reactions and in fact too active in a number of cases to be used as such. However, if a latent type catalyst which on the application of heat liberates boron trifluoride is used, the reaction may be controlled such that it gives a smooth conversion. The latent type of boron trifluoride catalysts referred to are usually coordinated compounds of boron trifluoride with amines, amides, sulfides and the like. Likewise, certain diazonium salts may be prepared which contain boron trifluoride in a form which is not active at ordinary temperatures but decomposes at higher temperatures to give boron trifluoride which catalyzes the polymerization or reaction through epoxide groups.

The final conversion of the composition made with the aldehyde sulfonamide condensates and with the polyepoxides or complex epoxides may be carried out with or without the use of solvents and with or without the use of plasticizers depending on the final results desired.

In protective coating applications it is usually desirable to apply a product which is essentially a solid dissolved in a solvent, in which case it undergoes a preliminary dry by mere solvent evaporation, and the dry film may then be converted to an infusible, insoluble product on further heat treatment; and the compositions of the present invention are well adapted for this purpose.

On the other hand, when the compositions of the present invention are used to make molded objects, it is usually desirable to use a composition which contains no solvent, and in some cases a composition which may be used in a dry powdered form.

In still other applications, it is desirable to have a composition, containing no solvent, which is sufficiently liquid at a relatively low temperature to be used directly in the impregnation of wood and certain fabric materials.

The present invention provides a wide range of reaction compositions and products including initial mixtures of the aldehyde sulfonamide condensates with the polyepoxides or complex epoxides as well as partial or intermediate reaction products of such initial mixtures, and compositions containing such intermediate reaction products as well as final reaction products and compositions.

Another modified form of the invention includes the use of mixtures of the ingredients or reactants which go to make up the complex epoxides, in place of preformed complex epoxides, to react with the aldehyde-sulfonamide condensates. Thus mixtures of simple polyepoxides and polyhydric phenols on the application of heat give complex epoxides as described in my prior application Serial No. 626,449. The conditions required for the reaction of complex epoxides with the aldehyde sulfonamide condensates are much the same as required for the reaction of the simple polyepoxides with polyhydric phenols and it is therefore possible to carry out all of these reactions as a part of the same process although it is probable that other reactions may also take place such as those between the simple polyepoxide and the aldehyde condensate as well as between the simple polyepoxides and polyhydric phenols to form complex reaction products.

Thus initial mixtures and compositions can be made containing a simple polyepoxide such as diepoxybutane or diglycide ether together with a polyhydric phenol such as bisphenol, etc. and the aldehyde sulfonamide condensates such as a p-toluene-sulfonamide-aldehyde condensate and such a mixture in proper proportions forms a valuable initial composition which can be used in liquid form or in solution and with subsequent heating either without or with the addition of a catalyst to bring about the reaction and to form intermediate reaction products of a resinous character or to form final reaction products. Such initial compositions containing simple polyepoxides, polyhydric phenols and aldehyde sulfonamide condensates can be used in much the same manner as initial compositions of complex epoxides and aldehydes sulfonamide condensates.

In general when simple polyepoxides are used with polyhydric phenols and aldehyde sulfonamide condensates a somewhat higher proportion of the polyepoxide is advantageously used than in making the complex epoxide separately by reacting the simple polyepoxides with polyhydric phenols.

Other modifying agents and compounding agents or reactants may also be used in making the new compositions. Thus, other resins such as alkyd resins or phenol aldehyde resins can be admixed with the aldehyde sulfonamide condensates or resins and with the polyepoxides or complex epoxides and reaction brought about by heating the mixture to form valuable compositions of a modified character.

The compositions of the present invention may be used without or with fillers and extenders of the inert type. For example, valuable enamels may be obtained by pigmenting the initial or intermediate compositions with the usual type of inert pigments used in the formulation of enamels and paints. It is also sometimes desirable to use such inert materials as wood flour or asbestos with the new compositions in the preparation of certain molded objects. For example, brake linings and clutch linings may be formulated from mixtures of asbestos type materials with the new compositions.

For certain applications such as the manufacture of certain resin bonded grinding wheels it is desirable to introduce abrasive materials and other fillers into the compositions in which the resinous composition acts as a bonding material for the fillers and abrasives when the compositions are subjected to final hardening.

The invention will be further illustrated by the following specific examples but it will be understood that the invention is not limited thereto. In the examples the parts are by weight.

The examples relating to the new compositions are Examples VI to VIII.

Examples I and II illustrate the production of the condensates of aldehydes and sulfonamides. Examples III to V illustrate the production of the complex epoxides.

*Example I.*—An amide-aldehyde resin was prepared by refluxing for 14 hours 171 parts (1 mole) p-toluene sulfonamide and 81 parts (1 mole) of formalin with 100 parts of ethyl alcohol. The syrup so prepared contained 60% solids by weight.

*Example II.*—A furfural resin solution was prepared by refluxing for 14 hours 171 parts (1 mole) of p-toluene sulfonamide and 96 parts (1 mole) of furfural in 100 parts of ethanol. This solution contained 58% solids.

*Example III.*—A complex epoxide was prepared by heating 3 moles of bisphenol with 3.88 moles of epichlorohydrin in the presence of 4.85 moles of sodium hydroxide giving a product which melted at 100° C. and having an equivalent weight to epoxide of 800.

*Example IV.*—A complex epoxide was prepared by heating 100 parts of the product of Example III with 5.3 parts of bisphenol taking one hour to go from 150° C. to 200° C. and holding at 200° C. for 1½ hours. This product melted at 130° C. and had an equivalent weight to epoxide of 1300.

*Example V.*—A complex epoxide was prepared from 8 moles of resorcinol and 9 moles of epichlorohydrin with 9.5 moles of sodium hydroxide and having a melting point of 87° C. and an equivalent weight to epoxide of 1780.

*Example VI.*—A solution of 30 parts of the product of Example I (based on solids) and 70 parts of the product of Example V in methyl ethyl ketone was mixed with 6 parts of diethylene triamine and spread as a film. The film converted to a hard coating on baking at 135° C. for 1 hour.

*Example VII.*—A mixture of 25 parts solids of the product of Example I and 75 parts of the product of Example IV in methyl ethyl ketone with 4 parts of hexamethylene diamine gave a film which converted well in 1 hour at 100° C.

*Example VIII.*—A molding resin was obtained by adding 25 parts (solids) of the product of Example I to 75 parts of the resin of Example III in methyl ethyl ketone. 5% sodium phenoxide based on the resin of Example III was then added and the solvent evaporated. The resulting product converted in 8 hours at 150° C.

In a similar manner other compositions and reaction mixtures and products can be produced from other condensates of aldehydes and sulfonamides with other polyepoxides or with complex epoxides or mixtures thereof.

It will thus be seen that the present invention provides improved resinous plastic compositions and products which condensates of sulfonamides and aldehydes are admixed with polyepoxides or complex epoxides or both or with simple polyepoxides and polyhydric phenols to form initial compositions capable of conversion into intermediate or into final reaction or polymerization products.

It will also be seen that the initial compositions may be used directly in making liquid coating compositions or in making molded articles, etc. with subsequent conversion by heating into the final reaction product.

It will further be seen that intermediate reactions products can be produced which are soluble and fusible and which are capable of further reaction to form final infusible products.

The new compositions are capable of admixture with various other resins in forming the final molding mixtures and can also be used for compounding with fillers in making molded articles or for impregnating paper, fabric, wood, etc. and in making impregnated or coated or laminated articles.

Products and compositions of varying properties can be produced by using varying proportions of the aldehyde sulfonamide condensate and of the polyepoxide or complex epoxide or both as well as by using resins of somewhat different properties. With high melting aldehyde sulfonamide condensates or high melting complex polyepoxide resins a limited amount of reaction may be sufficient to convert the mixed produce into a final infusible product. With aldehyde sulfonamide condensates or complex epoxide resins of an intermediate stage of condensation the reaction can be carried out in stages to form intermediate plastic compositions which can be subsequently converted into the final products.

The final infusible reaction and polymerization products made from the new compositions have a remarkable combination of desirable properties.

I claim:

1. New compositions containing in substantial proportions aldehyde-aryl sulfonamide resins containing active hydrogen and complex resinous epoxides which are polyether derivatives of polyhydric phenols containing an average of more than one epoxide group per molecule and free from functional groups other than epoxide and hydroxyl groups.

2. New compositions as defined in claim 1, said compositions being in the form of homogeneous liquids.

3. New compositions as defined in claim 1, said compositions being in the form of solutions of the resins in common organic solvents.

4. Infusible reaction products resulting from the reaction of substantial amounts of aldehyde aryl sulfonamide resins containing active hydrogen and complex resinous epoxides which are polyether derivatives of polyhydric phenols containing an average of more than one epoxide group per molecule and free from functional groups other than epoxide and hydroxyl groups.

5. Compositions as defined in claim 1, in which the aldehyde sulfonamide resin is a para-toluene sulfonamide formaldehyde resin and the complex resinous epoxide is made by reacting resorcinol with epichlorhydrin in the presence of sodium hydroxide.

6. Compositions as defined in claim 1, in which the aldehyde sulfonamide resin is a para-toluene sulfonamide formaldehyde resin and the complex resinous epoxide is made by reacting bisphenol with epichlorhydrin in the presence of sodium hydroxide.

SYLVAN OWEN GREENLEE.

REFERENCES CITED

The following references are of record in the file of this patent:

UNITED STATES PATENTS

| Number | Name | Date |
|---|---|---|
| 2,076,624 | De Groote | Apr. 1937 |

FOREIGN PATENTS

| Number | Country | Date |
|---|---|---|
| 447,417 | Great Britain | May 18, 1936 |